United States Patent [19]

Kondo et al.

[11] Patent Number: 5,658,219

[45] Date of Patent: Aug. 19, 1997

[54] CONTROL SYSTEM FOR AUTOMATIC TRANSMISSION FOR VEHICLE

[75] Inventors: Noboru Kondo; Kenzo Nishida, both of Wako, Japan

[73] Assignee: Honda Giken Kogyo Kabushiki Kaisha, Tokyo, Japan

[21] Appl. No.: 594,240

[22] Filed: Jan. 30, 1996

[30] Foreign Application Priority Data

Feb. 1, 1995 [JP] Japan ................... 7-015093

[51] Int. Cl.$^6$ ............ F16H 59/04; F16H 59/72; F16H 61/16

[52] U.S. Cl. .................. 477/122; 477/125; 477/134; 477/137; 477/142

[58] Field of Search .................. 477/122, 125, 477/134, 137, 142

[56] References Cited

U.S. PATENT DOCUMENTS

| | | | |
|---|---|---|---|
| 4,393,732 | 7/1983 | Suzuki et al. | 477/125 |
| 4,845,621 | 7/1989 | Kawata et al. | 477/125 X |
| 4,922,769 | 5/1990 | Tury | 477/125 |
| 5,127,288 | 7/1992 | Hojo et al. | |
| 5,172,609 | 12/1992 | Nitz et al. | |

FOREIGN PATENT DOCUMENTS

| | | |
|---|---|---|
| 365 715 | 5/1990 | European Pat. Off. . |
| 467 773 | 1/1992 | European Pat. Off. . |
| 640 779 | 3/1995 | European Pat. Off. . |
| 59-37359 | 2/1984 | Japan . |
| 2-8545 | 1/1990 | Japan . |
| 2-125174 | 5/1990 | Japan . |

*Primary Examiner*—Charles A. Marmor
*Assistant Examiner*—Nathan O. Jensen
*Attorney, Agent, or Firm*—Armstrong, Westerman, Hattori, McLeland & Naughton

[57] ABSTRACT

An automatic transmission for outputting shifting commands by manual operation of a manual shift lever in addition to an automatic shifting. When a first-stage shifting command is output, a clutch timer is set. When a second-stage shifting command is output during counting by the clutch timer, the second-stage shifting is prohibited. A shifting command storage timer is set simultaneously with the prohibition of the second-stage shifting. If the time is counted up by the clutch timer during counting by the shifting command storage timer, the second-stage shifting is permitted at this time point. If the time is counted up by the shifting command storage timer earlier than by the clutch timer, the second-stage shifting command is canceled. Thus, the first- and second-stage shifting operations are prevented from being continuously conducted, thereby suppressing the time lag required for the engagement of the hydraulic engagement element to the minimum.

7 Claims, 9 Drawing Sheets

1. During usual shifting

Operation of switch

Clutch timer   0

Gear shift stage   2   3   4

Clutch hydraulic pressure characteristic   2   3   4

First → t1   Second → t2

CONTROL SYSTEM FOR AUTOMATIC TRANSMISSION FOR VEHICLE

The present invention relates to a control system for an automatic transmission for a vehicle, wherein a manual shifting can be carried out in addition to an automatic shifting based on a usual shifting map.

BRIEF SUMMARY OF THE INVENTION

There is a conventionally known automatic transmission, designed so that an optimal gear shift stage is selected by searching a shifting map using detection values such, as a vehicle speed, an engine load and the like as parameters, and an automatic shifting operation is conducted to establish the optical gear shift stage. In such automatic transmission, shifting characteristics are established on the basis of a general travel state. For this reason, it is difficult to select the optimal gear shift stage in all travel states, and a throttle opening degree and an amount of accelerator pedal depressed down are detected, but eventually, the gear shift stage is uniformly selected. There are also conventionally known automatic transmissions in which a shifting characteristic, making great account of a power performance, and shifting characteristic, making great account of a specific fuel consumption, can be selected. In any of these automatic transmissions, however, it is hard to assert that a shifting characteristic, suitable for the driver's preference, is completely realized.

Therefore, automatic transmissions have been proposed which are designed so that any gear shift stage can be selected by operating a switch or a level by a driver (see Japanese Patent Application Laid-open Nos. 37359/84, 8545/90 and 125174/90). In such automatic transmission, when a shifting operation is manually conducted by the driver, without due consideration of a travel state of a vehicle, there is a possibility of an engine over-revolution, produced by a downshifting, or an engine stalling, produced by an upshifting. Therefore, in the automatic transmission described in Japanese Patent Application Laid-open No. 125174/90, the manual shifting is limited in accordance with the number of revolutions of the engine.

In the above known automatic transmissions, however, the number of revolutions of the engine, which must be necessarily taken into consideration, is only monitored, and the states of hydraulic engage elements (hydraulic clutches or hydraulic brakes) of the automatic transmission are not taken into consideration. For this reason, a variability in time required from the output of a shifting command to the completion of the shifting, is produced due to whether a hydraulic pressure operation chamber, or hydraulic pressure supply oil passage for the hydraulic engage elements, is sufficiently filled with a working oil by the shifting continuously conducted, or the hydraulic pressure operation chamber or hydraulic pressure supply oil passage for the hydraulic engage elements is almost empty as a result of the lapse of a time from the disengagement.

Especially, in the latter case, i.e., when the hydraulic pressure operation chamber or hydraulic pressure supply oil passage is almost empty, a time lag from the start of the manual shifting operation to the completion of the shifting is increased and for this reason, the responsiveness required in the manual shifting is not satisfactory. When two stage shifting runs are continuously conducted, the second stage hydraulic engage element is started to be operated before the operation of the first stage hydraulic engage element is finished so that the transmission of a sufficient power can be conducted. As a result, the power transmission is cut off over a long period of time and hence, the driver feels a large time lag.

The present invention has been accomplished with the above circumstances in view, and it is an object of the present invention to provide possibly shorter the time lag by conducting the shifting in consideration of the states of the hydraulic engage elements, when the shifting operation is manually conducted by the driver.

To achieve the above object, according to the present invention, there is provided a control system for an automatic transmission for a vehicle, which controls a gear ratio by switching over a plurality of engaged states of hydraulic engage elements, from one to another, based on an output from a vehicle speed detecting means, for detecting a value corresponding to a vehicle speed and an output, from an engine load detecting means, for detecting a value corresponding to an engine load the system comprising: a shifting command means, for manually outputting a shifting command for gear-shifting to a predetermined gear ratio, a torque transmitting capability value detecting means, for detecting a torque transmitting capability value of the hydraulic engage element which establishes a gear ratio commanded when a shifting command is output, end a shifting prohibiting means for prohibiting the execution of the shifting command, when the torque transmitting capability value defected by the torque transmitting capability value detecting means indicates a low transmitting capability.

The system further includes a storage means for storing the shifting command output by the shifting command means, and a delaying means, for executing the stored shifting command, when the torque transmitting capability value becomes a high transmitting capability within a predetermined period after prohibition of the shifting.

The predetermined period is counted by a timer. According to the present invention, the system further includes an informing means for informing a driver of the prohibition of the shifting.

In addition, the torque transmitting capability value is a magnitude of an engaging hydraulic pressure for the hydraulic engage element.

The torque transmitting capability value is obtained by periodically adding or subtracting a predetermined value to or from the torque transmitting capability value at the start of the operation of the hydraulic engage element.

The predetermined value is variable in accordance with at least one of the value corresponding to the vehicle speed, the value corresponding to the engine load, a shifting mode, an engine cooling water temperature and a transmission oil temperature.

If the torque transmitting capability value for the hydraulic engage element, detected by the torque transmitting capability value detecting means, indicates a low value when the shifting command means delivers .the shifting command, the shifting prohibiting means prohibits the execution of the shifting command.

When the torque transmitting capability value indicates a higher value within the predetermined period, after prohibition of the shifting, the delay means executes the shifting command stored in the storage means.

BRIEF DESCRIPTION OF THE DRAWINGS

The present invention will now be described by way of an embodiment with reference to the accompanying drawings.

DESCRIPTION OF THE PREFERRED EMBODIMENTS

Figure 1:
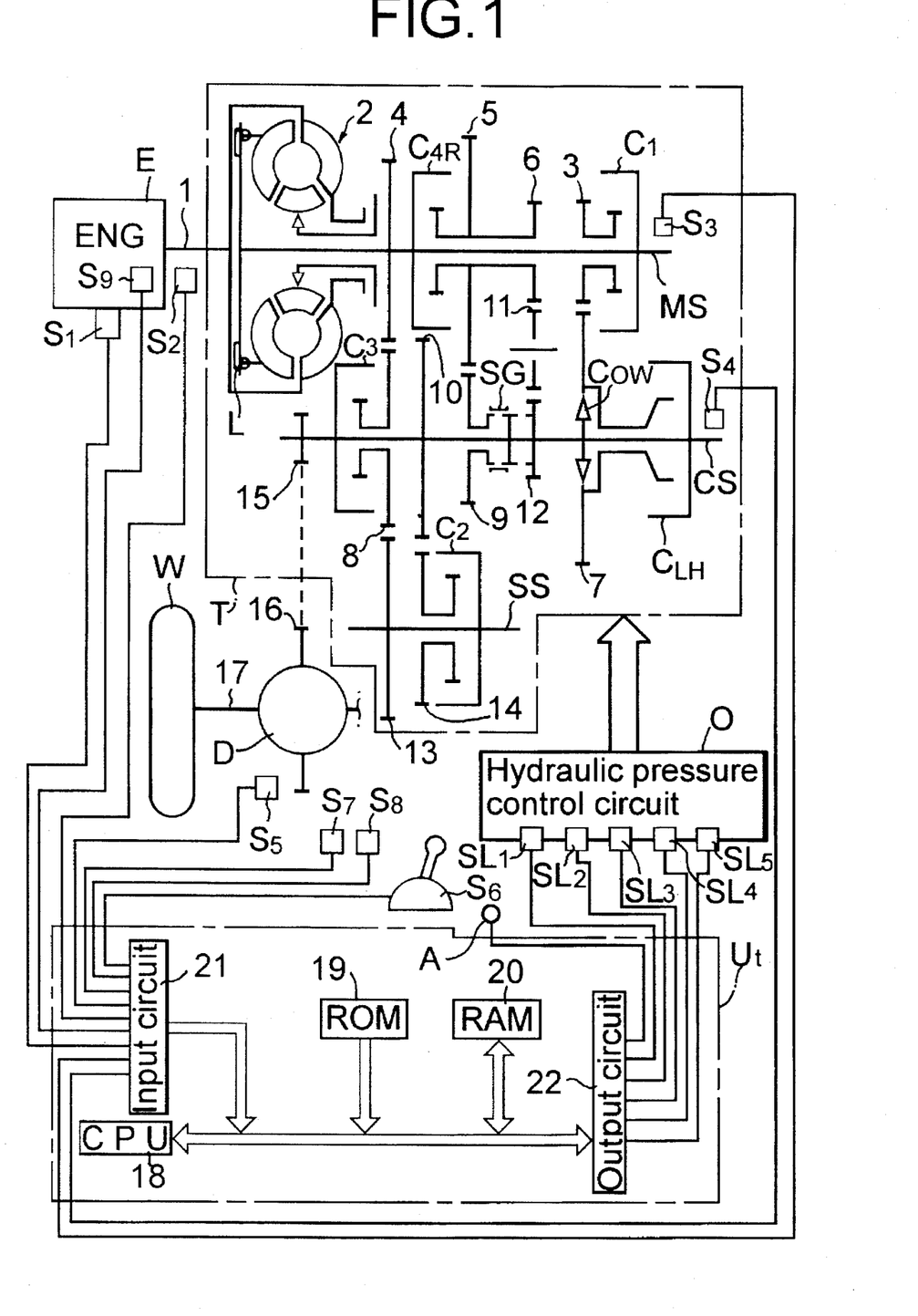
FIG. 1 is a diagrammatic illustration of the arrangement of an automatic transmission for a vehicle and a control system therefor.

FIG. 1 shows a 7-position type automatic transmission T for a vehicle in which it is possible to select any of the following seven ranges by the select lever: a "P" range, for parking, an "R" range, for reverse, an "N" range, for neutral, a "D" range for a first- to fourth-shift automatically shiftable range, an "M" range for a first- to fourth-shift manually shiftable range, a "2" range, for a second-shift fixing range including a downshifting from a third gear shift stage to a second gear-shift stage, and a "1" range a first-shift fixing range including a downshifting from the second gear-shift stage to a first gear-shift stage.

The automatic transmission T, FIG. 1, includes a main shaft MS, connected to a crankshaft 1, of an engine E, through a torque converters 2, having a lock-up clutch L, end a courter shaft CS and a secondary shaft SS disposed parallel to the main shaft MS.

Carried on the main shaft MS are a main first-shift gear 3: a main second-shift/third-shift gear 4, a main fourth-shift gear 5 and a main reverse gear 6. Carried on the counter shaft CS are a counter first-shift gear 7 meshed with the main first-shift gear 3, a counter second-shift/third-shift gear 8 meshed with the main second-shift/third-shift gears, a courter fourth-shift gear 9 meshed with the main fourth-shift gear 5, a counter second-shift gear 10, and a counter reverse gear 12 connected to the main reverse gear 6 through a reverse idle gear 11. Carried on the secondary shaft SS are a first second-shift gear 13 meshed with the counter second-shift/third-shift gear 8, and a second secondary second-shift gear 14 meshed with the counter second-shift gear 10.

When the main first-gear 3, relatively rotatably carried on the main shaft MS, is coupled to the main shaft MS by a first-shift clutch $C_1$ a first gear-shift stage is established. The first-shift clutch $C_1$ is maintained in its engaged state even when any of second to fourth gear-shift stages is established, and hence, the counter first-shift gear 7 is supported through a one-way clutch $C_{ow}$. When the second secondary second-shift gear 14, relatively rotatably carried on the secondary shaft SS, is coupled to the secondary shaft SS, by a second-shift clutch $C_2$, a second gear-shift stage is established. When the counter second-shift/third-shift gear 8, relatively rotatably carried on the counter shaft $C_3$, is coupled to the counter shaft CS by a third-shift clutch $C_3$, a third gear-shift stage is established.

When the main fourth-shift gear 5, relatively rotatably carried on the main shaft MS, is coupled to the main shaft MS by a fourth-shift/reverse clutch $C_{4r}$, in a condition in which the counter fourth-shift gear 9, relatively rotatably carried on the counter shaft CS, has been coupled to the counter shaft CS by a select gear SG, a fourth gear shift stage is established. When the main reverse gear 6, relatively rotatably carried on the main shaft MS, is coupled to the main shaft MS by a fourth-shift/reverse clutch $C_{4r}$, in a condition in which the counter reverse gear 12, relatively rotatably carried on the counter shaft CS has been coupled to the counter shaft CS, by the select gear SG, a backward gear-shift stage is established.

The rotation of the counter shaft CS is transmitted, through a final drive gear 15 and a final driven gear 16, to a differential D and then, from the differential D, through left and right axles 17, 17, to driven wheels W, W.

Further, when the counter first-shift gear 7 is coupled to the counter shaft CS, by the first-shift holding clutch $C_{LH}$ in a condition in which the first-shift clutch $C_1$ has been brought into its engaged state, a first-shift holding gear shift stage is established. If the first-shift holding gear shift stage is established, when an engine brake is required, the torque of the driven wheels W, W can be transmitted back to the engine E, even if the one-way clutch $C_{ow}$ is slipped.

An electronic control unit Ut, for controlling the automatic transmission T, includes CPU 18, ROM 19, RAM 20, an input circuit 21 and an output circuit 22.

Inputted to the input circuit 21 of the electronic control unit Ut, are a throttle opening degree TH, detected by a throttle opening degree sensor S1 mounted in the engine E, an engine revolution-number Ne detected by an engine revolution-number sensor $S_2$, mounted in the engine E, a main shaft revolution number Nm, detected by a main shaft revolution-number sensor $S_3$, mounted on the main shaft MS, a counter shaft revolution-number Nc, detected by a counter shaft revolution-number sensor $S_4$, mounted on the counter shaft CS, a vehicle speed V, detected by a vehicle speed sensor $S_5$, mounted on the differentials, a select lever position P, detected by a select lever position sensor $S_6$, a signal from an upshifting switch $S_7$ which will be described hereinafter, a signal from a downshifting switch $S_8$ which will be described hereinafter, and a cooling-water temperature Tw, detected by a water temperature sensor $S_9$ mounted in the engine E.

The output circuit 22, of the electronic control unit Ut, is connected to five solenoids $SL_1$ $SL_2$, $SL_3$, $SL_4$ and $SL_5$, mounted in a hydraulic pressure control circuit 0, to control the operations of the first-shift clutch $C_1$, the second-shift clutch $C_2$, the third-shift clutch $C_3$, the fourth-shift/reverse clutch $C_{4r}$, the first-shift holding clutch $C_{LH}$, the selector gear SG and the lock-up clutch L. The solenoid $SL_1$ governs the turning ON and OFF of the lock-up clutch L. The solenoid $SL_2$ governs the control of the capacity of the lock-up clutch L. The solenoids $SL_3$ and $SL_4$ govern the turning ON and OFF of the first-shift clutch $C_1$, the second-shift clutch $C_2$, the third-shift clutch $C_3$, the fourth-shift/reverse clutch $C_{4r}$ and the first-shift holding clutch $C_{LH}$, as well as the operation of the selector gear SG. The solenoid $SL_5$ governs the control of the clutch hydraulic pressure.

Further, an informing means A, such as a buzzer, a lamp, a speaker, and the like, for informing the driver, is connected to the output circuit 22 of the electronic control unit Ut.

Figure 2:
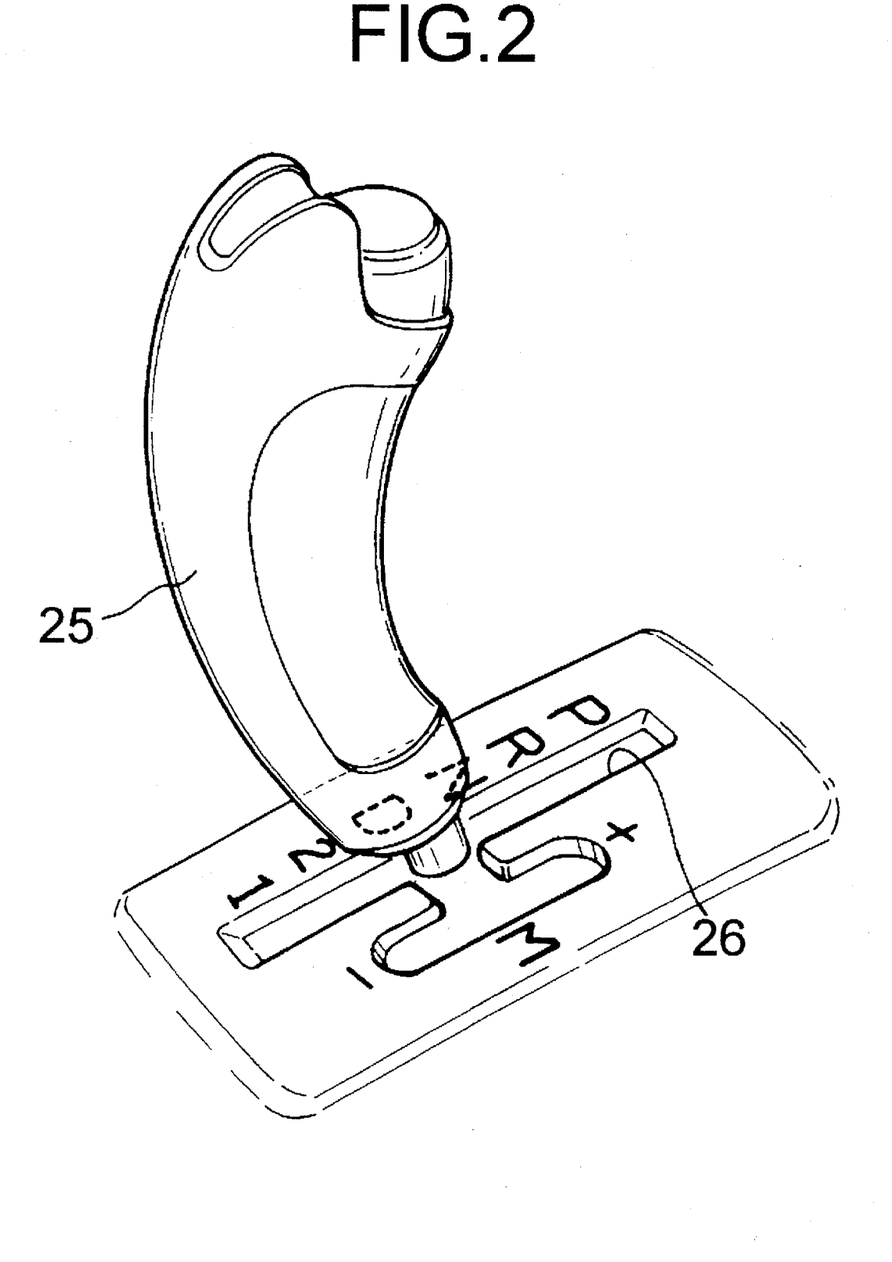
FIG. 2 is a perspective view of a select lever used along with a manual shift lever.

As shown in FIG. 2, the ranges selected by the select lever 25, include the "M" range (the first- to fourth-shift manually shiftable range) in addition to the usual "P", "R", "N", "D", "2" and "1" ranges. A guide groove 26, for guiding the select lever 25, is formed into a substantially H shape. A position, to which the select lever 25 is tilted rightwardly from the "D" range, is the "M" range, where the select lever 25 is tiltable longitudinally. If the select lever 25 is tilted forwardly (in a plus direction) in the "M" range, the upshifting switch $S_7$ is operated to deliver an upshifting command. On the other hand, if the select lever 25 is tilted rearwardly (in a minus direction), the downshifting switch $S_8$ is operated to deliver a downshifting command.

Figure 3:
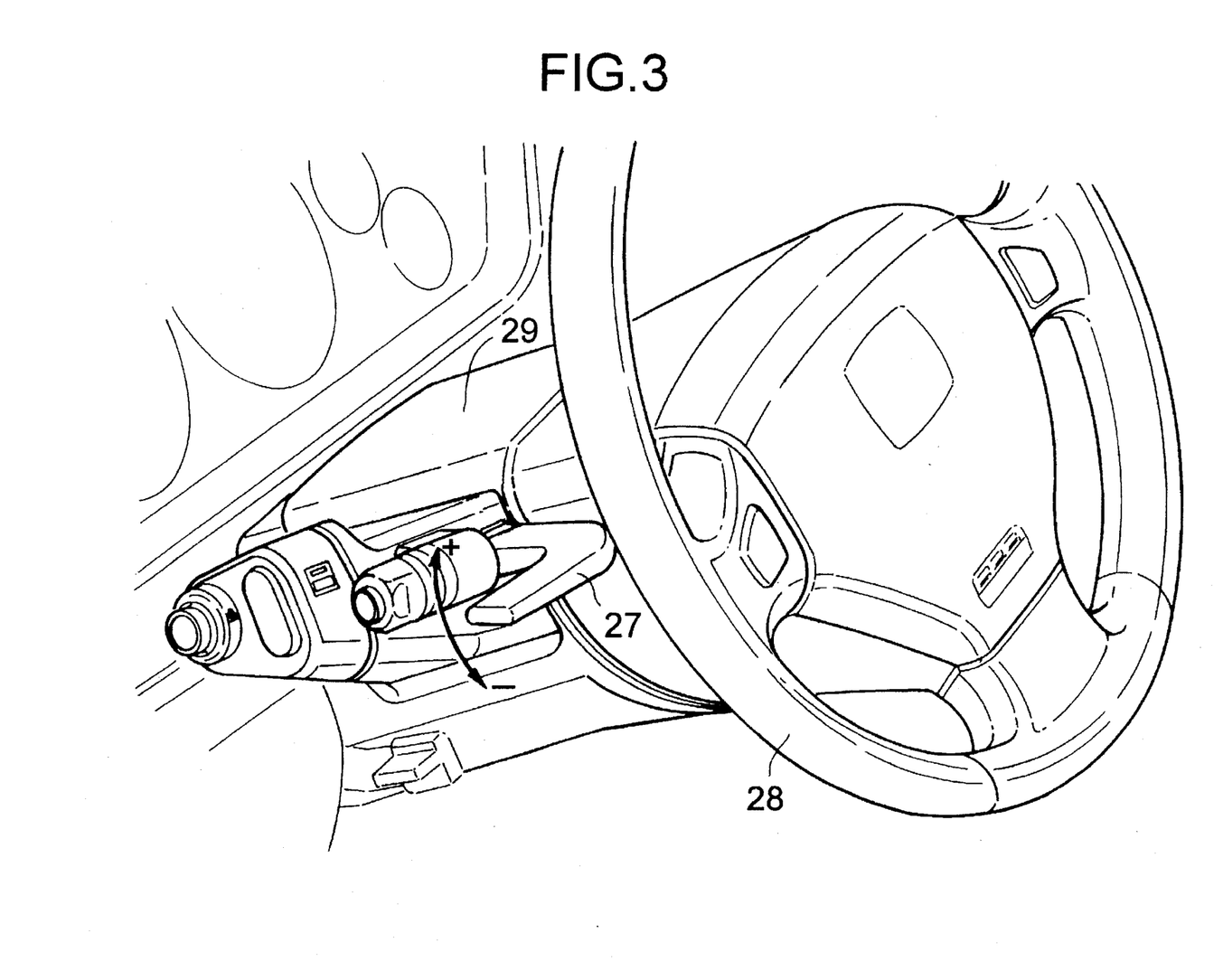
FIG. 3 is a perspective view of the manual shift lever mounted on a steering column.

FIG. 3 shows a manual shift lever 27, mounted independently from the select lever 25. The manual 'shift lever 27 is vertically swingably mounted on a left side of a steering column 29, which supports a steering wheel 28. The select lever 25 (not shown) has the "M" range between the "D" and "2" ranges. If the manual shift lever 27 is tilted upwardly (in the plus direction) in a condition in which the "M" range has been selected by the select lever 25, the upshifting switch $S_7$ is operated to deliver the upshifting command. On the other hand, if the manual shift lever 27 is tilted downwardly (in the minus direction), the downshifting switch $S_8$ is operated to output the downshifting command.

Figure 4:
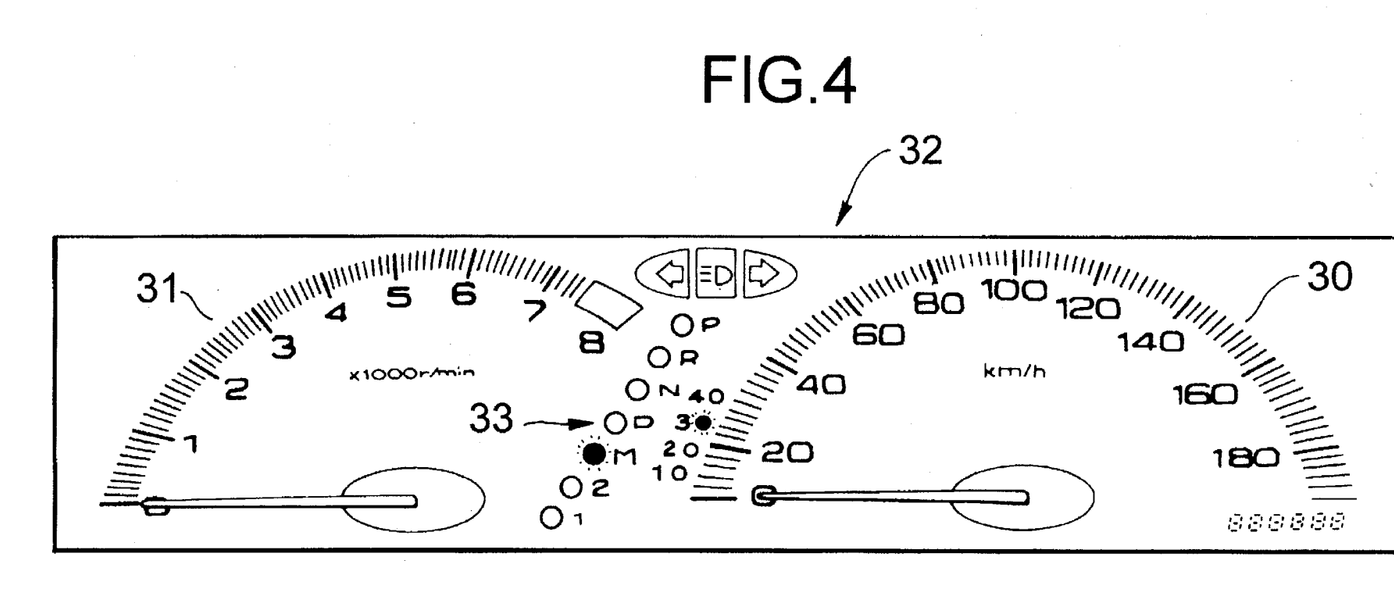
FIG. 4 is an illustration of an indicator for select positions and gear shift stages.

A range selected by the select lever 25, FIG. 2, is indicated by an indicator 33, FIG. 4, which is mounted on a meter panel 32 including a speedometer 30 and a tachometer 31, as shown in FIG. 4. When the "M" range is selected, the gear shift stage currently established is indicated by the indicator 33. Alternatively, a range selected by the select lever 25 may be indicated on an indicator 33 provided in a tachometer 31, or the like, as shown in FIG. 5, and when the "M" range is selected, the gear shift stage, currently established, is indicated on the indicator 33.

Figure 5:
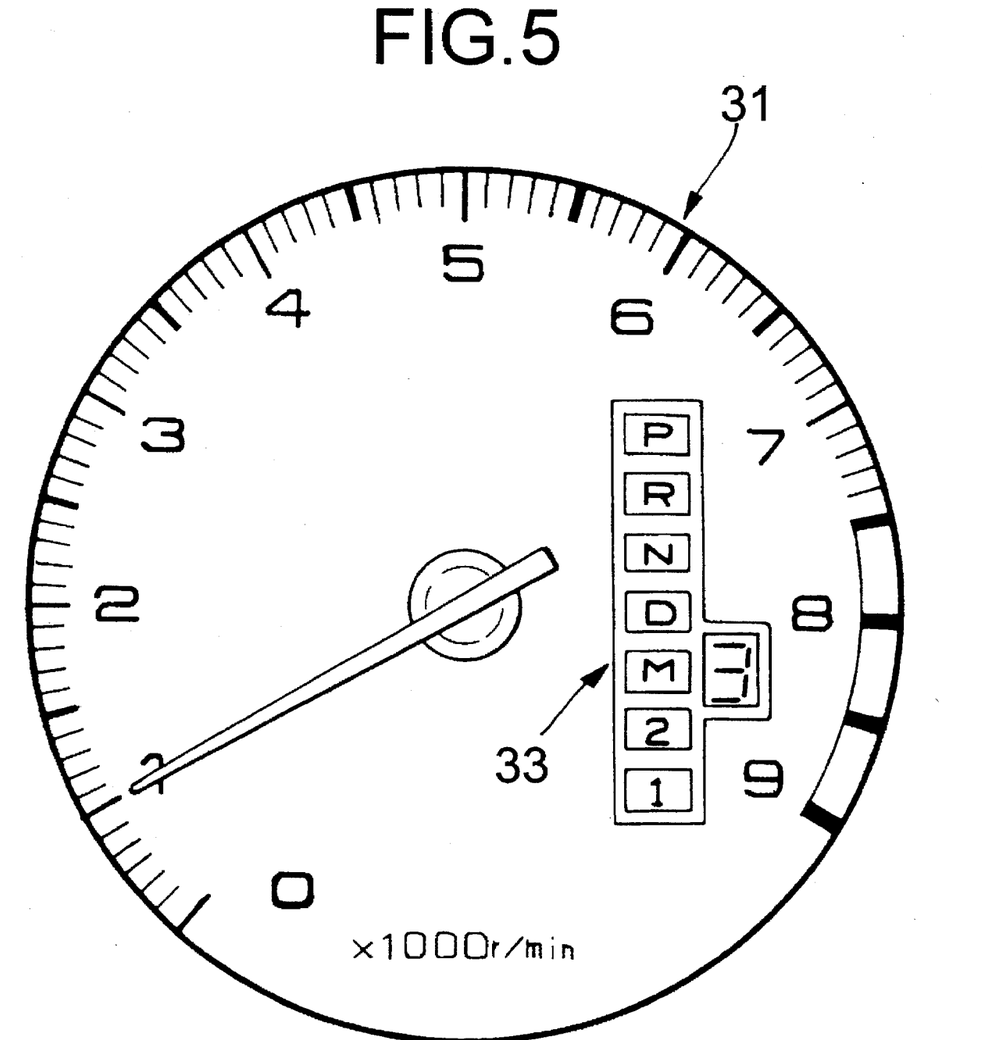
FIG. 5 is an illustration of an alternate indicator for select positions and gear shift stages.

In FIGS. 4 and 5, if the indication of the gear shift stage, currently established, is flashed, the visual recognizability Is further enhanced. In place of indicating the first-shift to fourth-shift gear shift stages by numerals 1 to 4, respectively, the gear ratio in each of these gear shift stages may be indicated.

When the "D" range has been selected, by the select lever 25, the upshifting and downshifting, between the first-shift to fourth-shift gear shift stages, are automatically carried out based on a shift map using, as parameters, the vehicle speed V, detected by the vehicle speed sensor $S_5$ and the throttle opening degree TH, detected by the throttle opening degree sensor $S_1$. When the "2" range is selected, the second gear shift stage is established. However, if the vehicle speed provided upon selection of the "2" range is large, so that an over revolution occurs in the second gear shift stage, the third gear shift stage is first established, and after the vehicle speed is reduced, the third gear shift stage is downshifted to the second gear shift stage which is then fixed. Similarly, if the vehicle speed provided upon selection of the "1" range is large, so that an over revolution occurs in the first-shift holding gear shift stage, the second gear shift stage is first established, and after the vehicle speed is reduced, the second gear shift stage is downshifted to the first-shift holding gear shift stage which is then fixed When the range has been switched over from the "D" range to the "M" range, if the gear shift stage in the "D" range, before the switching-over, is any of the first to third gear shift stages, the same gear shift stage is held in the "M" range after the switching-over. If the gear shift stage in the "D" range, before the switching-over, is the fourth gear shift stages, the third gear shift stage is established in the "M" range after the switching-over. However, if an over revolution occurs, upon the establishment of the third gear shift stage, the fourth gear shift stage is established.

When the range has been switched over from the "2" range, to the "M" range, even if the gear shift stage in the "2" range before the switching-over, is any of the third and second gear shift stages, the third gear shift stage is established in the "M" range, after the switching-over. However, when the range has been switched over from the "2" range to the "M" range, during stoppage of the vehicle, the first gear shift stage is established in the "M" range, after the switching-over.

Further, by operating the upshifting switch $S_7$, or the downshifting switch $S_8$, during stoppage of the vehicle, the first or second gear shift stage can be selected as a gear shift stage at the start of the vehicle.

The manual gear-shifting, conducted by operating the upshifting switch $S_7$, or the downshifting switch $S_8$, in the "M" range will be described below with reference to a flow chart shown in FIG. 6.

First, when the shifting switch (the upshifting switch $S_7$ or the downshifting switch $S_8$) is operated in the "M" range 16 (at step S1, FIG. 6), the shifting command is stored, and a clutch timer is set. For example, when the second gear shift stage is upshifted to the third gear shift stage, the second-shift clutch $C_2$, currently in the engaged state, is disengaged, while at the same time, the third-shift clutch $C_3$ is newly brought into its engaged state. The time, counted by the clutch timer, is set so as to be longer than a time period from the start of the disengagement of the second-shift clutch $C_2$ to the completion of the engagement of the third clutch $C_3$. The clutch timer constitutes a means for detecting the torque transmitting capability of a hydraulic engage element. During counting by the clutch timer, it is determined that the hydraulic engage element is not in its completely engaged state. During non-counting by the clutch timer, it is determined that the hydraulic engage element are in its completely engaged state.

During non-counting by the clutch timer and when it is determined the hydraulic engage element is in the completely engaged states (at step S2), the commanded shifting is permitted (at step S3). When the downshifting command is output, the gear shift stage is downshifted to a gear shift stage which is one stage lower than the current gear shift stage. When the upshifting command is output, the gear shift stage is upshifted to a gear shift stage which is one stage higher than the current gear shift stage.

If the answer at step S2 is YES and the clutch time is counting and, if it is determined that the hydraulic engage element is not in the completely engaged state, a shifting command storage timer is set (at step S4). At the beginning of setting of the shifting command storage timer, the clutch timer is still counting (at step S5), and the shifting command storage timer is also counting (at step S6) and hence, a loop of steps S5 and S6 is repeated. Thereafter, when the time is counted up by the shifting command storage timer, before the time is counted up by the clutch timer (at step S6), the shifting is prohibited to cancel the shifting command (at step S8).

During counting by the shifting command storage timer, i.e., while the shifting commanded by the driver is being delayed, the informing means A is operated to inform the driver of the state. Thus, the driver can reliably recognize the delay of the shifting before feeling a time lag, and it is possible to prevent an unnecessary operation of the shifting switch. The time of operation of the informing means A can be set at a given time, from the start of the counting, by the shifting command storage timer.

If it is determined (step S5) that the time has been counted up by the clutch timer, to cause the hydraulic engage element to reach the completely engaged state during repetition of the loop of steps S5 and S6, the shifting command is carried out (at steps S7 and S3), if the shifting command storage timer is still counting. On the other hand, if the time has already been counted up by the shifting command storage timer, the shifting command is canceled (at steps S7 and S8).

The contents of the flow chart will be further described with respect to the upshifting, from the second gear shift stage, via the third gear shift stage to the fourth gear shift stage.

Figure 7:
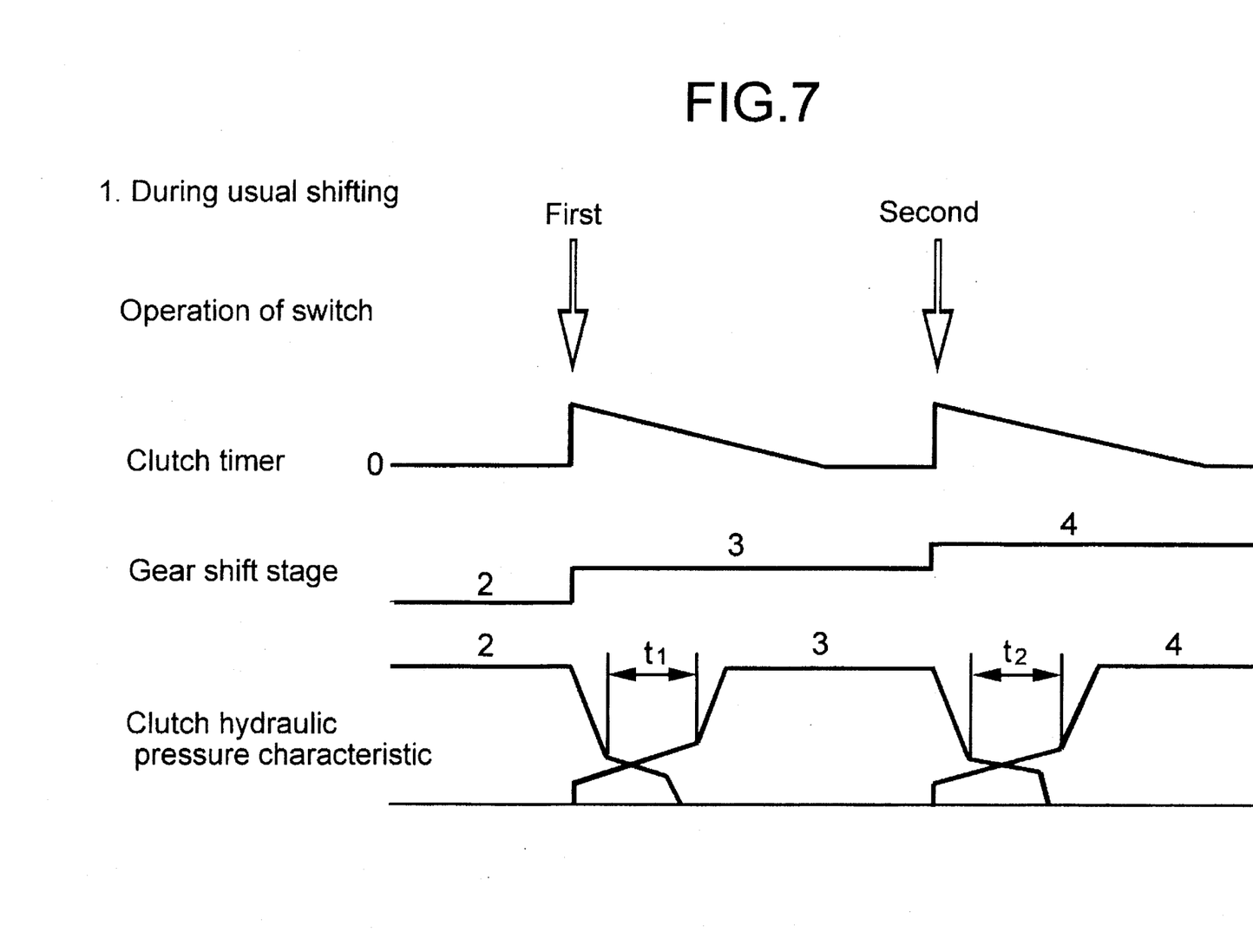
FIG. 7 is a time chart for explaining the operation.

FIG. 7 is a time chart in which two runs of operation of the upshifting switch $S_7$ have been conducted at a sufficient time interval. More specifically, the first operation of the upshifting switch $S_7$ causes the shifting, from the second gear shift stage to the third gear shift stage, to be immediately started, whereby the hydraulic pressure for the second-shift clutch $C_2$ is started to be decreased, while the hydraulic pressure for the third-shift clutch $C_3$ is started to be increased, and at the same time, the clutch timer is set. After establishment of the third gear shift stage with the lapse of a time $t_1$, the time is counted up by the clutch timer and thereafter, the second operation of the upshifting switch $S_7$ is conducted. At this time, the third gear shift stage has already been established and hence, when the second operation of the upshifting switch $S_7$ is conducted, the shifting from the third gear shift stage to the fourth gear shift stage is immediately carried out.

When the two runs of operation of the upshifting switch $S_7$ have been conducted at the sufficient time interval in this manner, this shifting is immediately carried out without prohibition. Accordingly, the driver only feels the minimum time lags $t_1$ and $t_2$ required for the structure of the automatic transmission T.

Figure 8:
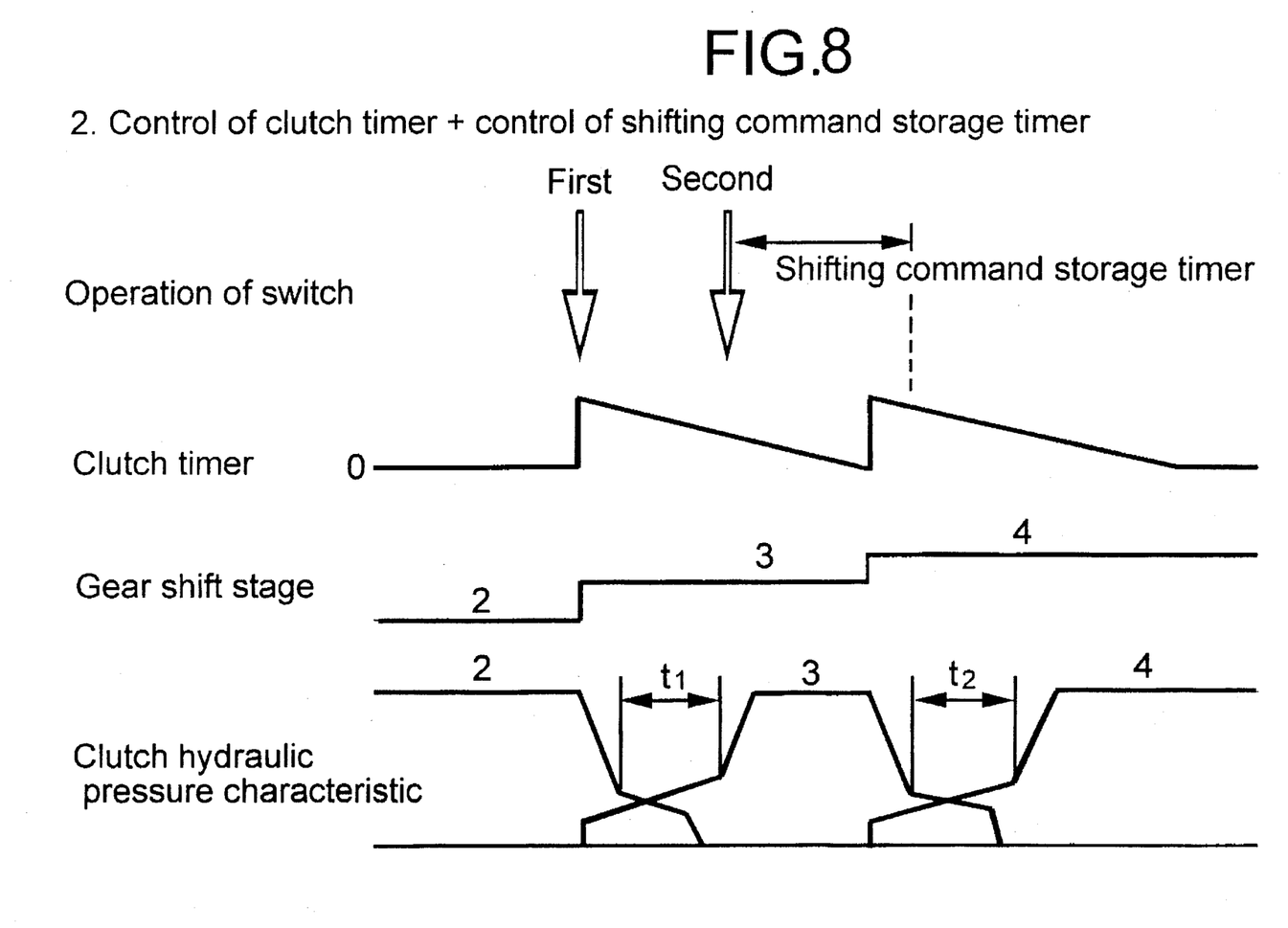
FIG. 8 is a time chart for explaining the operation.

FIG. 8 is a time chart in which two runs of operation of the upshifting switch $S_7$ have been conducted at a time interval shorter than that in FIG. 7. More specifically, the first operation of the upshifting switch $S_7$ causes the shifting, from the second gear shift stage to the third gear shift stage, to be immediately started, while causing the clutch timer to be set. During counting by the clutch timer, the second operation of the upshifting switch $S_7$ is conducted. At this time, the clutch timer is counting. Therefore, the shifting from the third gear shift stage to the fourth gear shift stage, by the second operation of the upshifting switch $S_7$, is prohibited, and the shifting command storage timer is set simultaneously with the second operation of the upshifting switch $S_7$. When it is determined that, before the time is counted up by the shifting command storage timer, the time is counted up by the clutch timer to cause the third-shift clutch to reach the completely engaged state, the time is counted up by the clutch timer and at the same time, the shifting (which has been prohibited hitherto), from the third gear shift stage to the fourth gear shift stage, is permitted and carried out.

Even in this case, the driver only feels the minimum time lags $t_1$ and $t_2$ required for the structure of the automatic transmission T.

Figure 9:
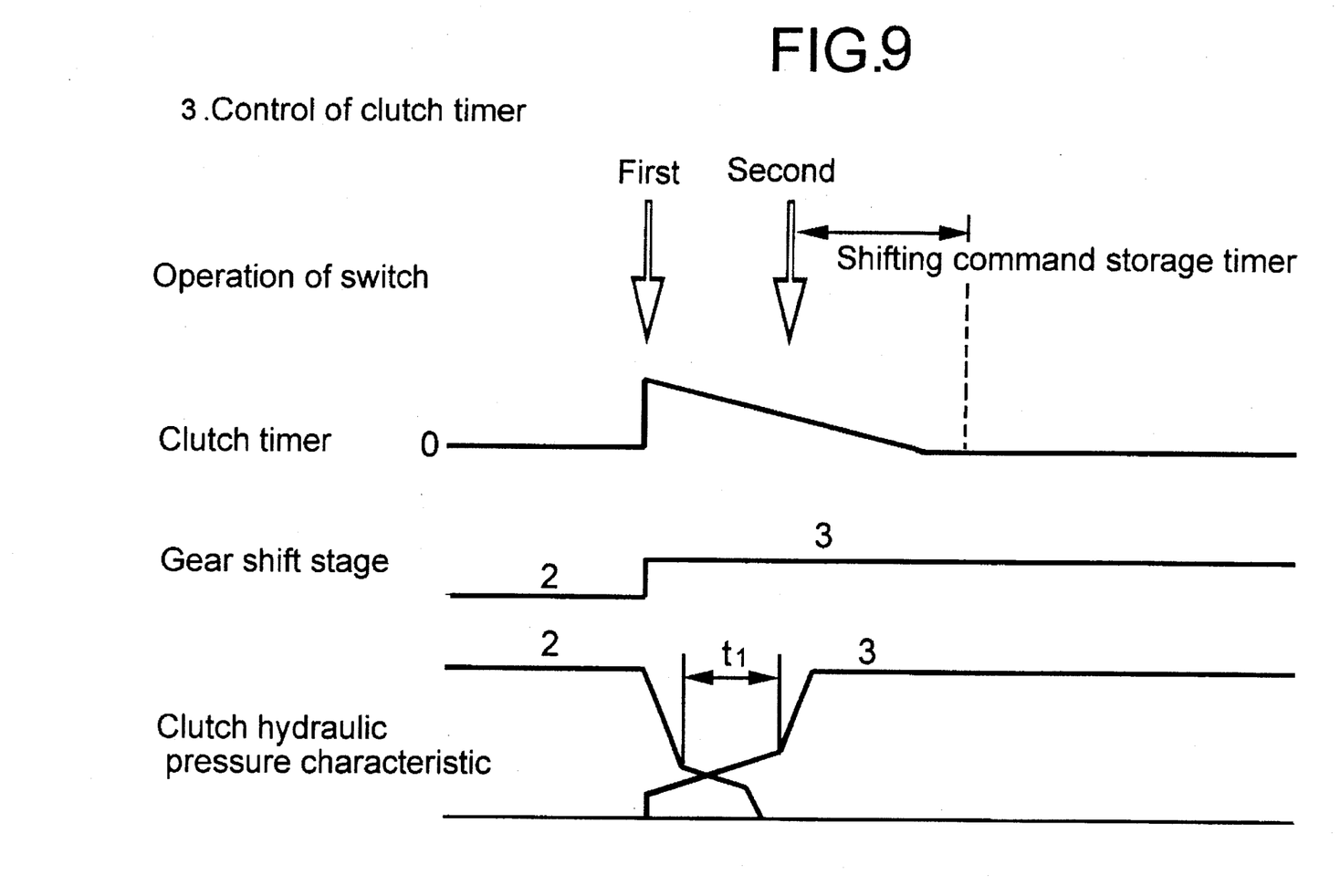
FIG. 9 is a time chart for explaining the operation.

FIG. 9 is a time chart in which two runs of operation of the upshifting switch $S_7$ have been conducted at a time interval further shorter than that in FIG. 8. Even in this case, during counting by the clutch timer, set simultaneously with the first operation of the upshifting switch $S_7$, the second operation of the upshifting switch $S_7$ is conducted. Therefore, the shifting, from the third gear shift stage to the fourth gear shift stage by the second operation of the upshifting switch $S_7$ is prohibited. The time is counted up by the shifting command storage timer, set simultaneously with the second operation of the upshifting switch $S_7$ earlier than the counting-up by the clutch timer which is counting, and hence, the second shifting command is canceled without being conducted. Due to the provision of the shifting command storage timer, the maximum delayed time for the shifting is limited to within the time to be counted by the shifting command storage timer and accordingly, the driver cannot be confused as a result of the shifting carried out after an extreme delay. Thus, the driver only feels the minimum time lag required for the structure of the automatic transmission T.

Supposing that the second shifting command is immediately provided in FIGS. 8 and 9, the time lag $t_1$, for the shifting from the second gear shift stage to the third gear shift stage, is consecutive with the time lag $t_2$, for the shifting from the third gear shift stage to the fourth gear shift stage, resulting in an extremely long time lag, as much as $t_1+t_2$ in a longest case.

Figure 6:
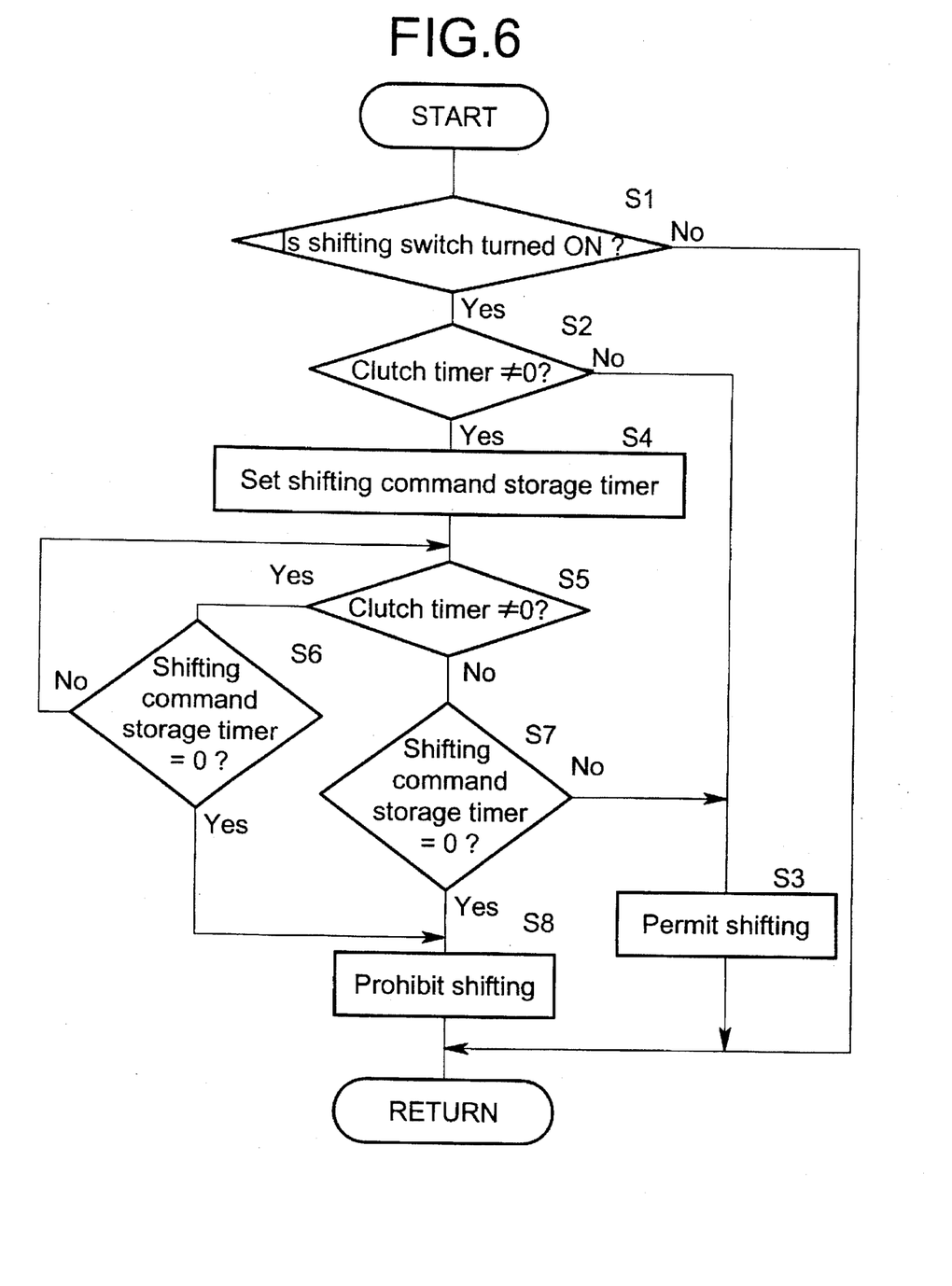
FIG. 6 is a flow chart for explaining the operation.

The upshifting has been described above, and even for the downshifting, a similar control is carried out based on the flow chart shown in FIG. 6, wherein the general lag of a long time lag, due to the two shifting runs continuously carried out is prevented.

The time counted by the clutch time is set, for example, in a range of 0.7 to 0.8 seconds.

Although the embodiment of the present invention has been described above, it will be understood that the present invention is not limited to the above-described embodiment, and various modifications in design may be made without departing from the spirit and scope of the invention.

For example, although the clutch timer is exemplified as the torque transmitting capability detecting means in the embodiment, an adder or a subtracter for adding or subtracting a predetermined value at every given time interval may be used in place of the clutch timer, thereby further accurately evaluating a time required for the operation of the hydraulic engage element, during shifting, by changing such predetermined value in accordance with the vehicle speed V, detected by the vehicle speed sensor $S_5$, the throttle opening degree TH, detected by the throttle opening de-tree sensor $S_1$, the cooling-water temperature Tw, detected by the water temperature sensor Sg, the transmission oil temperature detected by a transmission oil temperature sensor (not shown), the shifting mode, or the like.

Specifically, when the engine E is in a high rotation and high load condition, or when the downshifting switch $S_8$ is operated in a condition in which an accelerator pedal has been depressed down, the predetermined value is increased and set so that the time for prohibiting the shifting is shortened. When at a low temperature, the predetermined value is decreased and set so that the time for prohibiting the shifting is shortened.

Further, the engaging hydraulic pressure for the hydraulic engage element maybe directly defected by a pressure sensor in order to further accurately estimate the torque transmitting capability of the hydraulic engage element.

According to the present invention, if the shifting command is output when the torque transmitting capability value for the hydraulic engage element indicates the low transmitting capability, the conduction of the shifting command is prohibited. Therefore, even if a plurality of shifting commands, closely spaced at time intervals, are output, the succeeding-stage hydraulic engage element is prevented from being started before the completion of the operation of the proceeding-stage hydraulic engage element. Thus, it is possible to shorten the time lag felt by the driver to the minimum.

According to the present invention, the shifting command delivered by the shifting command means is previously stored, and when the torque transmitting capability value indicates the higher transmitting capability within the predetermined period from the prohibition of the shifting, the stored shifting command is executed. Therefore, the driver's shifting command can be possibly executed, while shortening the time lag, thereby eliminating the need for the re-operation, and moreover, the driver is prevented from being confused by the shifting conducted after an extremely delay.

It is possible to reliably detect the predetermined period by the timer.

According to the present invention, the driver can be forced to recognize the prohibition of the shifting, so he does not feel a sense of incompatibility, and it is possible to avoid the driver's mix-recognition of the occurrence of trouble.

In the present invention, it is possible to accurately evaluate the torque transmitting capability value based on the magnitude of the engaging hydraulic pressure for the hydraulic engage element.

It is possible to change the torque transmitting capability value to any value by changing the predetermined value.

It is also possible to accurately evaluate the torque transmitting capability value by changing the predetermined value in accordance with at least one of the value depending upon the vehicle speed, the value depending upon the engine load, the shifting mode, the engine cooling water temperature and the transmission oil temperature.

We claim:

1. A control system for an automatic transmission for a vehicle, which controls gear ratio by switching over a plurality of engaged states of hydraulic engage elements from one element to another, based on an output from a vehicle speed detecting means for detecting a value corresponding to a vehicle speed and an output from an engine load detecting means for detecting a value corresponding to an engine load, comprising:

a shifting command means for manually outputting a shifting command for gear-shifting to a predetermined gear ratio, a torque transmitting capability value detecting means for detecting a torque transmitting capability value of a hydraulic engage element which establishes a gear ratio commanded when a shifting command is output, and a shifting prohibiting means for prohibiting the execution of the shifting command, when the torque transmitting capability value detected by said torque transmitting capability value detecting means indicates a low transmitting capability.

2. A control system for an automatic transmission for a vehicle according to claim 1, further including a storage means for storing the shifting command output by said shifting command means, and a delaying means for conducting said stored shifting command, when the torque transmitting value becomes a high transmitting capability value within a predetermined period after prohibition of the shifting.

3. A control system for an automatic transmission for a vehicle according to claim 2, wherein said predetermined period is counted by a timer.

4. A control system for an automatic transmission for a vehicle according to claim 1, further including informing means for informing a driver of the prohibition of shifting.

5. A control system for an automatic transmission for a vehicle according to claim 1, wherein said torque transmitting capability value is hydraulic pressure of said hydraulic engage element.

6. A control system for an automatic transmission for a vehicle according to claim 1, wherein said torque transmitting capability value is obtained by periodically adding or subtracting a predetermined value to or from torque transmitting capability value at the start of the operation of said hydraulic engage element.

7. A control system for an automatic transmission for a vehicle according to claim 6, wherein said predetermined value is variable in accordance with at least one of said value corresponding to the vehicle speed, an engine load, shifting mode, an engine cooling water temperature and a transmission oil temperature.

* * * * *